(12) United States Patent
Liu et al.

(10) Patent No.: US 11,772,095 B2
(45) Date of Patent: Oct. 3, 2023

(54) MICROFLUIDIC ROUTING

(71) Applicant: IMEC VZW, Leuven (BE)

(72) Inventors: Chengxun Liu, Kessel-Lo (BE);
Bivragh Majeed, Lubbeek (BE);
Abdulkadir Yurt, Heverlee (BE)

(73) Assignee: IMEC VZW, Leuven (BE)

( * ) Notice: Subject to any disclaimer, the term of this patent is extended or adjusted under 35 U.S.C. 154(b) by 430 days.

(21) Appl. No.: 16/771,025

(22) PCT Filed: Dec. 20, 2018

(86) PCT No.: PCT/EP2018/086135
§ 371 (c)(1),
(2) Date: Jun. 9, 2020

(87) PCT Pub. No.: WO2019/122092
PCT Pub. Date: Jun. 27, 2019

(65) Prior Publication Data
US 2021/0162414 A1      Jun. 3, 2021

(30) Foreign Application Priority Data
Dec. 22, 2017   (EP) .................... 17210334

(51) Int. Cl.
*B01L 3/00*      (2006.01)
*G01N 15/14*    (2006.01)
*G01N 15/00*    (2006.01)

(52) U.S. Cl.
CPC ... *B01L 3/502761* (2013.01); *B01L 3/502707* (2013.01); *B01L 3/502715* (2013.01);
(Continued)

(58) Field of Classification Search
CPC ............ B01L 3/502761; B01L 3/5027; B01L 3/502715; B01L 2200/0652;
(Continued)

(56) References Cited

U.S. PATENT DOCUMENTS

2006/0165342 A1   7/2006  Pau et al.
2015/0024373 A1   1/2015  Xia et al.
(Continued)

FOREIGN PATENT DOCUMENTS

EP        2602608 A1    6/2013
EP        3040750 A1    7/2016
(Continued)

OTHER PUBLICATIONS

International Search Report and Written Opinion, Application No. PCT/EP2018/086135, dated Feb. 28, 2019, 16 pages.

*Primary Examiner* — Brian J. Sines
(74) *Attorney, Agent, or Firm* — McDonnell Boehnen Hulbert & Berghoff LLP

(57) ABSTRACT

A microfluidic routing device for routing objects of interest in a microfluidic flow includes a substrate; a first layer provided on the substrate, in which the first layer forms a bottom wall of a microfluidic channel. At least two holes through the first layer form respectively an inlet and an outlet for the microfluidic channel The microfluidic routing device further includes a second layer spaced away from the first layer, in which the second layer forms a top wall of the microfluidic channel. The second layer is configured to transmit an optical signal from the microfluidic channel. The microfluidic routing device includes an actuator for actuating the objects of interest in a sorting junction of the microfluidic channel.

17 Claims, 13 Drawing Sheets

(52) U.S. Cl.
CPC .. *G01N 15/1434* (2013.01); *B01L 2200/0652* (2013.01); *B01L 2200/12* (2013.01); *B01L 2300/0654* (2013.01); *B01L 2300/0887* (2013.01); *G01N 15/1484* (2013.01); *G01N 2015/0065* (2013.01); *G01N 2015/149* (2013.01)

(58) Field of Classification Search
CPC ........ B01L 2300/0887; G01N 15/1434; G01N 15/1484; G01N 15/1436; G01N 2015/0065; G01N 2015/149
See application file for complete search history.

(56) References Cited

U.S. PATENT DOCUMENTS

| | | | |
|---|---|---|---|
| 2015/0111196 A1* | 4/2015 | Xia | G01N 15/1484 435/5 |
| 2015/0141267 A1* | 5/2015 | Rothberg | C12Q 1/6869 250/208.2 |
| 2018/0328850 A1* | 11/2018 | Rothberg | G01N 21/64 |

FOREIGN PATENT DOCUMENTS

| | | | |
|---|---|---|---|
| WO | 2005108963 A1 | 11/2005 | |
| WO | 2014031900 A1 | 2/2014 | |
| WO | 2016050837 A1 | 4/2016 | |

* cited by examiner

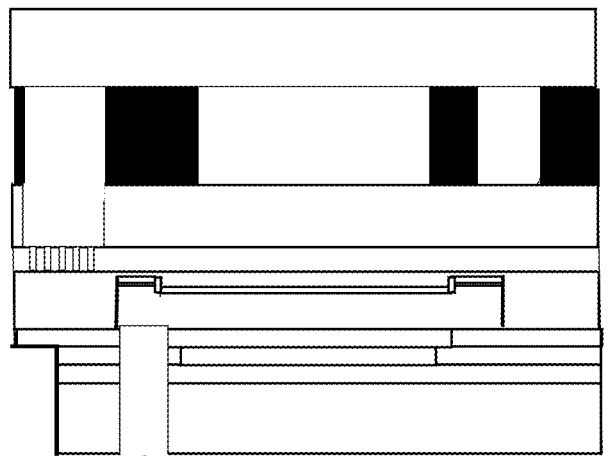
210 FIG 23
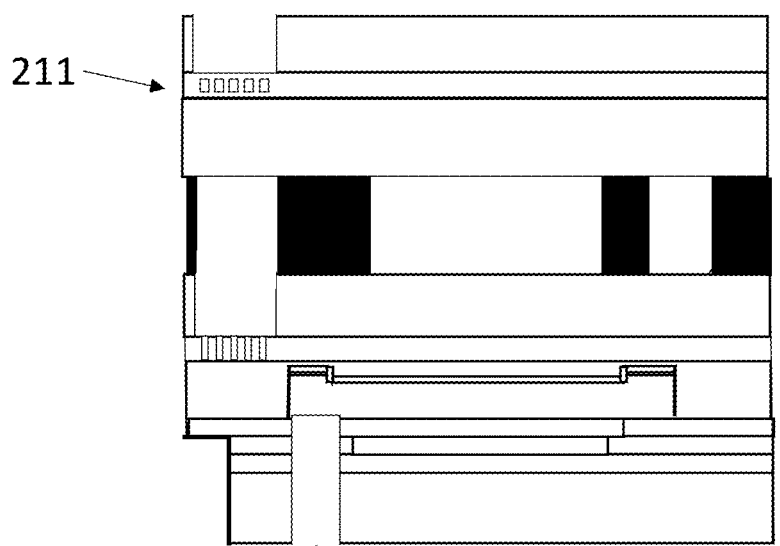
210 FIG 24

MICROFLUIDIC ROUTING

CROSS-REFERENCE TO RELATED APPLICATIONS

This application claims the benefit under 35 U.S.C. § 371 of the filing date of International Patent Application No. PCT/EP2018/086135, having an international filing date of Dec. 20, 2018, which claims priority to European Application No. 17210334.3, filed Dec. 22, 2017, the contents of both of which are incorporated herein by reference in their entirety.

FIELD OF THE DISCLOSURE

The application relates to the field of microfluidic devices. More specifically, this application relates to a microfluidic routing device for routing objects of interest in a microfluidic flow, a related cartridge, a related system, and a related method for manufacturing such a device and/or cartridge.

BACKGROUND

Microfluidic routing devices are useful for various applications, such as for use in cell router systems for detecting, sorting, and/or characterizing biological entities of interest, e.g., target cells. Such a cell router system may be used as a generic or specific clinical tool, e.g., for quantification and cellular characterization of a target cell type. For example, the number of detected cells of a given target type can be an important clinical marker for therapy follow-up, e.g., follow-up of cancer metastasis and/or minimal residual diseases. Exemplary applications of a cell router system include the analysis of a blood sample for chronic lymphocytic leukemia diagnosis or follow-up or for circulating tumor cell monitoring, the analysis of a bone marrow sample for myeloma diagnosis or follow-up, the analysis of a lymph node biopsy for Hodgkin disease diagnosis or follow-up, the analysis of a urine sample and/or the enrichment of a sample for sequencing.

A router system can also be used for detection and purification of entities of interest immersed in a microfluidic flow. For example, biological entities of interest, e.g., target cells, may be introduced in a microfluidic flow as a component of a mixture of multiple types of entities, e.g., a mixture of different cell types obtained from a crude sample. The isolation of the target entities from background entities may be preferred or required for downstream analysis, e.g., a specific analysis of the target cell, such as cell culturing, immunocytochemistry, DNA and/or RNA fluorescence in-situ hybridization and/or a next-generation sequencing analysis. Such an approach may find application in, for example, companion diagnostics, cell therapy, and pathological research. For example, T-cells may be sorted from a blood sample for application in cell therapy, or specific sperm cells may be selected from a semen sample for application in sperm sexing.

A microfluidic router system, e.g., a cell router system, may comprise a microfluidic routing device, e.g., in the form of a cell router cartridge; and an instrument, in which the routing device can be mounted in the instrument for analysis or processing of a sample. The microfluidic routing device may be disposable, e.g., may be a single-use cartridge. The microfluidic routing device may comprise functional components for physically handling the sample, e.g., sample and/or reagent tanks, cell preparation components, cell routing elements, and/or post-sorting processing components. The instrument may comprise all peripheral hardware and/or software to facilitate the operation of the microfluidic routing device, e.g., for system-level control and to provide a user interface, for actuation and control of the fluidics in the routing device, for optical detection of a light source and signal processing for fluorescence detection and/or cell imaging, for control and driving of the in-cartridge electrical components of the routing device, and/or for post-sorting cell dispensing, e.g., to transfer sorted cells to vials or onto glass slides in a sorted cell suspension. Particularly, the hardware of the instrument may be designed to avoid physical contact with the sample, e.g., to improve sample processing accuracy with minimal possibility of sample contamination.

US 2006/165342 discloses a microfluidic optical sensor comprising an optical waveguide capable of propagating light from an optical input port to an optical output port. The optical waveguide comprises an optical waveguide interaction region and a fluidic channel capable of conducting a fluid from a fluid input port to a fluid output port. The fluidic channel comprises a fluidic channel region separated from the optical waveguide interaction region by an interposed spacing material configured to transmit an evanescent field of the light through the spacing material between the optical waveguide interaction region and the fluidic channel region. The microfluidic optical sensor comprises an optical resonator.

WO 2016/050837 discloses a system for analysis and/or sorting of microscopic objects in a sample fluid comprising an optical objective for optical inspection of the microscopic objects. Microscopic objects are conveyed in a laminar flow of the sample fluid, and two laminar and planar flow of sheath fluids are provided. The flow of the sample fluid is hydrodynamically focused at an optical inspection zone of the system by the sheath fluids. Focusing of the flow of the sample fluid is controlled such that all of the microscopic objects in the sample fluid are caused to be conveyed in a common flow direction in one single plane at the inspection zone of the system, and the microscopic objects in the fluid are optically inspected through the optical objective.

SUMMARY

This application discloses embodiments that provide good and efficient means for microfluidic routing, e.g., in a device and/or system for routing, e.g., sorting, objects of interest in flow.

The above objective is accomplished by various method and device embodiments.

In an embodiment, a compact and cheap device is provided that is suitable for use in a cartridge, e.g. a disposable cartridge.

In an embodiment, efficient means for introducing a fluid into a microfluidic channel are provided.

In an embodiment, efficient means for powering a sorter for objects in microfluidic flow are provided.

In an embodiment, a microfluidic routing device can be easily and cheaply manufactured.

In an embodiment, a microfluidic routing device in a cartridge can be easily provided with an input light wave, an input fluid flow, and/or an input electric signal.

In an embodiment, an output optical signal can be easily collected from a microfluidic routing device in a cartridge.

In an embodiment, a fluid sample introduced into a cartridge, e.g., a disposable cartridge, can be easily collected and disposed of.

In an embodiment, objects of interest can be easily captured or collected in a self-contained unit.

In an embodiment, a microfluidic routing device can be easily scaled up by implementing a large number of parallel channels, e.g., without substantially increasing costs of a disposable cartridge component.

In an embodiment, contamination is avoided, or the risk of contamination is strongly reduced by packaging fluid-handling components in a substantially self-contained package.

In an embodiment, the viability, e.g., the intactness, of the routed objects of interest can be preserved, e.g., by providing, substantially, a non-contact mechanism for routing the objects with a low risk of physically damaging or otherwise adversely affecting the objects of interest, e.g., during a sorting process. Therefore, the routed, e.g., sorted, objects of interest can be reused for other purposes and applications afterwards.

In a first aspect, a microfluidic routing device for routing objects of interest in a microfluidic flow. The device comprises a substrate, a first layer provided on the substrate, and a second layer spaced away from the first layer. The first layer forms a bottom wall of a microfluidic channel, e.g., for transporting the objects of interest in the microfluidic flow. At least two holes through the first layer form respectively an inlet and an outlet for the microfluidic channel. The second layer forms a top wall of the microfluidic channel, in which the second layer is adapted for transmitting an optical signal from the microfluidic channel. The device comprises an actuator for actuating the objects of interest in a sorting junction of the microfluidic channel.

A microfluidic routing device in accordance with embodiments may comprise a spacer layer for spacing the second layer away from the first layer and for defining the microfluidic channel, e.g., for defining the microfluidic channel and the sorting junction. The spacer layer may be on top of, e.g., in direct contact with and directly on top of the first layer. The second layer may be on top of, e.g., in direct contact with and directly in top of the spacer layer, such that the second layer forms a top wall of the microfluidic channel.

In a microfluidic routing device in accordance with embodiments, the first layer may comprise a waveguide for conveying a light wave and an input light coupler for coupling the light wave into the waveguide from an external source, e.g., an external light source.

In a microfluidic routing device in accordance with embodiments, the input light coupler may be adapted for coupling the light wave into the waveguide from a side of the first layer that is opposite from the side on which the first layer abuts on the substrate.

In a microfluidic routing device in accordance with embodiments, the first layer may comprise an output light coupler for coupling light out of the waveguide and into the microfluidic channel.

In a microfluidic routing device in accordance with embodiments, the second layer may comprise an optical element for refracting and/or diffracting the optical signal toward a predetermined region of space outside the device for receiving a light transducing element.

In a microfluidic routing device in accordance with embodiments, the first layer may comprise a plurality of output light couplers for coupling light out of the waveguide and into the microfluidic channel in corresponding predetermined regions of the microfluidic channel, and the second layer may comprise a corresponding plurality of optical elements for collecting light from the predetermined regions of the microfluidic channel.

In a microfluidic routing device in accordance with embodiments, the predetermined regions in the microfluidic channel may provide detection spots for forward light scattering, side scattering, fluorescence detection, holographic imaging and/or conventional microscopic imaging.

In a microfluidic routing device in accordance with embodiments, the actuator may be adapted for receiving an electric supply and/or a control signal via at least one electrical conductor provided through the substrate, in which the at least one electrical conductor may form an externally accessible contact on the side of the substrate that is opposite to the side of the substrate on which the microfluidic channel is provided.

A microfluidic routing device in accordance with embodiments may comprise a momentum detection region in the sorting junction or upstream with respect to the sorting junction, in which the device may be adapted, in or near the momentum detection region, for sensing a linear moment and/or velocity of an object approaching the sorting junction and/or wherein the momentum detector is adapted to trigger a routing signal.

A microfluidic routing device in accordance with embodiments may be adapted, in or near a validation detection region, for detecting an object of interest after leaving the sorting junction.

A microfluidic routing device in accordance with embodiments may comprise a capture region for capturing the objects of interest after leaving the sorting junction.

A microfluidic routing device in accordance with embodiments may comprise a microfluidic flow focuser for focusing a flow of a fluid in the microfluidic channel.

A second aspect relates to a disposable microfluidic router cartridge comprising an enclosure and a microfluidic routing device in accordance with embodiments of the first aspect, in which the device is encapsulated in the enclosure.

A third aspect relates to a microfluidic router system comprising a microfluidic router cartridge in accordance with embodiments of the second aspect and an instrumentation module, wherein the instrumentation module and the microfluidic router cartridge are adapted for facilitating the microfluidic router cartridge to be mounted into and/or onto the instrumentation module to facilitate an analysis and/or a processing of a fluid sample comprising objects of interest. The instrumentation module comprises a light transducing element for receiving an optical signal indicative of an object of interest in a microfluidic channel of the microfluidic routing device in the cartridge.

A fourth aspect relates to a method for manufacturing a microfluidic routing device in accordance with embodiments of the first aspect. The method comprises providing a substrate, providing a first layer on, e.g., in direct contact with and directly on top of, the substrate and providing a spacer layer on, e.g., in direct contact with and directly on top of, the first layer for spacing a second layer away from the first layer and for defining a microfluidic channel, e.g., between the first layer and the second layer. The method comprises providing the second layer on, e.g., in direct contact with and directly on top of the spacer layer such that the second layer forms a top wall of the microfluidic channel. The second layer is adapted for transmitting an optical signal from the microfluidic channel. The method comprises providing at least two holes through the first layer to form, respectively, an inlet and an outlet for the microfluidic channel. The method comprises manufacturing a sorting junction in the microfluidic channel and an actuator for actuating said objects of interest in said sorting junction.

Particular and preferred aspects are set out in the accompanying independent and dependent claims. Features from the dependent claims may be combined with features of the independent claims and with features of other dependent claims as appropriate and not merely as explicitly set out in the claims.

These and other aspects will be apparent from and elucidated with reference to the embodiment(s) described hereinafter.

BRIEF DESCRIPTION OF THE FIGURES

FIG. 23 shows a backside etch step for forming a through silicon via for connecting electrical components, such as the heater conductor, in a method in accordance with embodiments.

FIG. 24 shows a step of providing at least one optical element, e.g., a flat lens, in a method in accordance with embodiments.

Figure 1:
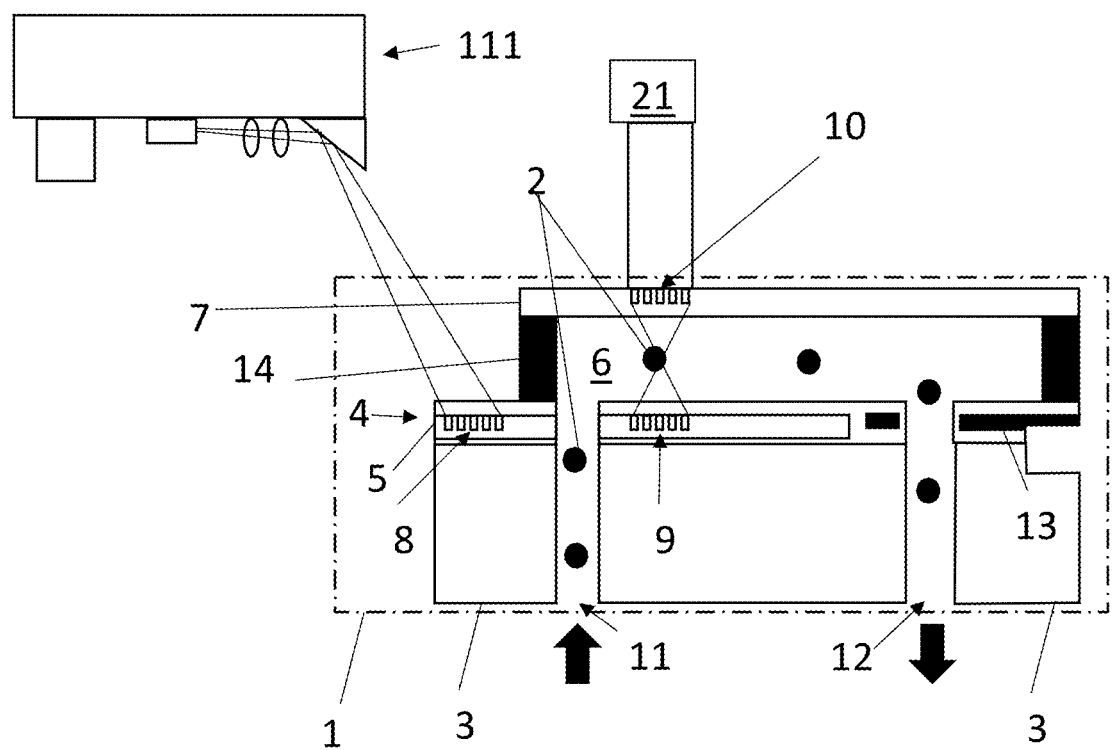
FIG. 1 illustrates a side view of a first exemplary device in accordance with embodiments.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION

Various aspects with respect to particular embodiments are described below with reference to certain drawings. The claims are not understood to be limited to these embodiments. The drawings described are schematic and are considered to be non-limiting. In the drawings, the size of some of the elements may be exaggerated and not drawn on scale for illustrative purposes. The dimensions and the relative dimensions do not correspond to actual reductions to practice.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments described herein are capable of operation in other orientations than described or illustrated herein.

It is to be noticed that the term "comprising," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures, or characteristics may be combined in any suitable manner, as would be apparent to one of ordinary skill in the art from this disclosure, in one or more embodiments.

Similarly, it should be appreciated that in the description of exemplary embodiments, various features are sometimes grouped together in a single embodiment, figure, or description thereof for the purpose of streamlining the disclosure and aiding in the understanding of one or more of the various aspects. This method of disclosure, however, is not to be interpreted as reflecting an intention that more features are required than are expressly recited in each claim. Rather, as the following claims reflect, aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the claims and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures, and techniques have not been shown in detail in order not to obscure an understanding of this description.

A first aspect relates to a microfluidic routing device for routing objects of interest in a microfluidic flow. The device comprises a substrate, and a first layer on the substrate, in which the first layer forms a bottom wall of a microfluidic channel. At least two holes through the first layer form respectively an inlet and an outlet for the microfluidic channel. The device comprises a second layer spaced away from the first layer, in which the second layer forms a top wall of the microfluidic channel. The second layer is adapted for transmitting an optical signal from the microfluidic channel. The first and second layers may have the same or different dimensions, e.g., the same or different overall lateral dimensions. The microfluidic routing device comprises an actuator for actuating the objects of interest in a sorting junction of the microfluidic channel. The microfluidic routing device may comprise a spacer layer for spacing the second layer away from the first layer and for defining the microfluidic channel.

Figure 2:
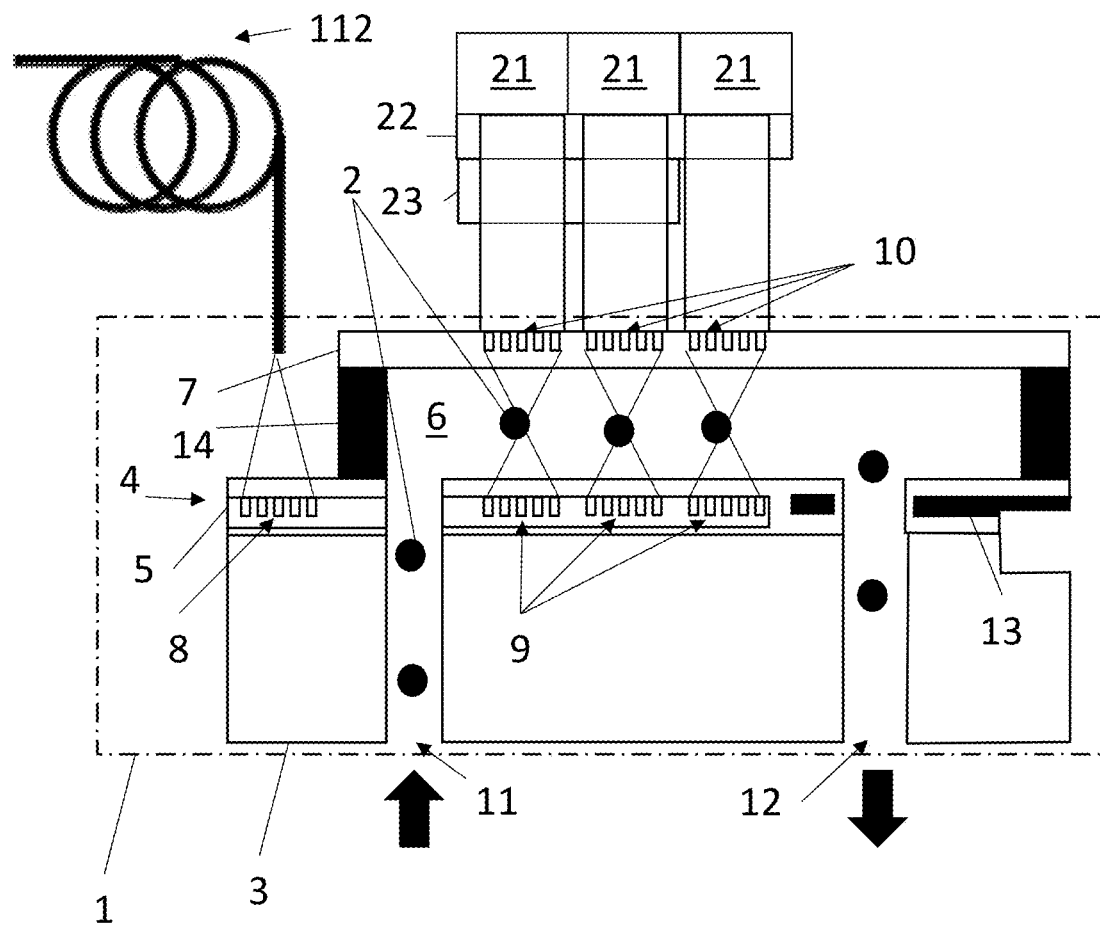
FIG. 2 illustrates a side view of a second exemplary device in accordance with embodiments.

FIG. 1 and FIG. 2 illustrates exemplary microfluidic routing devices 1 for routing objects of interest 2 in a microfluidic flow, in accordance with embodiments.

The device 1 comprises a substrate 3. The substrate may comprise a semiconductor substrate, e.g., a silicon substrate, or a substrate made from another suitable material, e.g., as known in the art, such as glass or quartz. The substrate 3 may, for example, comprise a plastic material, and/or the device 1 may be encapsulated in a plastic enclosure. For example, embodiments may relate to a cartridge, e.g., a disposable cartridge, comprising the device 1 and an enclosure, e.g., a plastic enclosure. The substrate 3, e.g., the plastic substrate, may form part of the enclosure.

The device further comprises a first layer 4 provided on the substrate 3, in which the first layer 4 forms a bottom wall of a microfluidic channel 6. It shall be understood by the skilled person that the first layer may be a multi-layer, e.g., comprise a stack of different layers, e.g., comprising different materials and/or patterned individually.

The device also comprises a second layer 7 spaced away from the first layer 4, e.g., spaced away from the first layer on a side of the first layer that is opposite from the side on which the first layer 4 abuts on the substrate 3. The second layer 7 forms a top wall of the microfluidic channel 6. It shall be understood by the skilled person that the second layer may be a multi-layer, e.g., comprise a stack of different layers, e.g., comprising different materials and/or patterned individually.

For example, the device 1 may comprise a spacer layer 14 for spacing the second layer 7 away from the first layer 4 and for defining the microfluidic channel 6, e.g., for defining sidewalls of the microfluidic channel. For example, a photo-patternable adhesive layer may bond the first and second layers while spacing these layers apart.

At least two holes through the first layer 4 form respectively an inlet 11 and an outlet 12 for the microfluidic channel 6. For example, a first hole, e.g., a first through-hole, may form an inlet 11 such as to facilitate a microfluidic flow into the microfluidic channel from a side of the first layer 4 that is opposite to the side of the first layer 4 on which the microfluidic channel 6 is arranged. A second hole, e.g., a second through-hole, may form an outlet 12, such as to facilitate a microfluidic flow out of the microfluidic channel to a side of the first layer 4 that is opposite to the side of the first layer 4 on which the microfluidic channel 6 is arranged.

The device may comprise a plurality of logically parallel microfluidic channels, e.g., to operate and process a fluid sample in a divide-and-conquer parallel approach. 'Logically' parallel may refer to an arrangement that is not necessarily physically parallel, but that can be represented in a flow diagram by mutually parallel paths.

For example, the microfluidic routing device in accordance with embodiments may comprise a plurality of microfluidic channels, e.g., in the first layer of the substrate and/or in first layers of a plurality of substrates, e.g., which may be interconnected.

Figure 28:
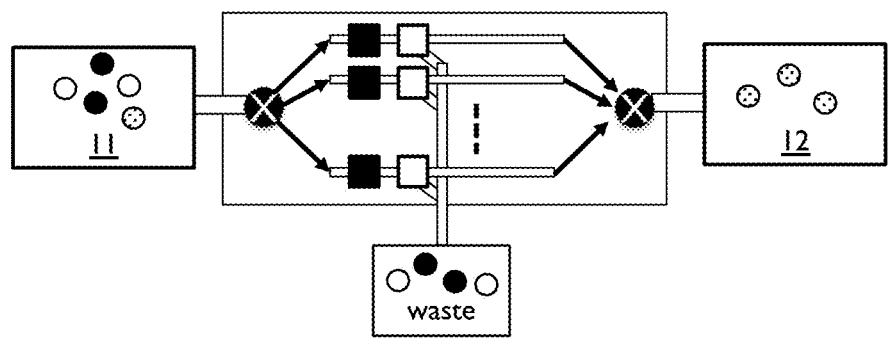
FIG. 28 illustrates a first exemplary configuration of a plurality of microfluidic channels in a device in accordance with embodiments.

The microfluidic routing device, in accordance with embodiments, may be organized in different configurations, e.g., to achieve a desired performance depending on the intended application. FIG. 28 shows a first exemplary configuration for the device comprising a plurality of microfluidic channels.

For example, different types of objects, e.g., a mixture of different types of particles, may be suspended in a liquid that is introduced via an inlet 11 into the device. The device may be adapted for sorting out one specific type of object from the fluid. The device may comprise a plurality of microfluidic channels and routing elements associated therewith. For example, in such configuration, the microfluidic flow received via the inlet 11 may be distributed over a plurality of logically parallel microfluidic channels, in which each branch may be substantially identically configured, e.g., each particle detection and routing element may be essentially configured in accordance with a same set of parameters such as to identify and route the target type of objects.

Figure 29:
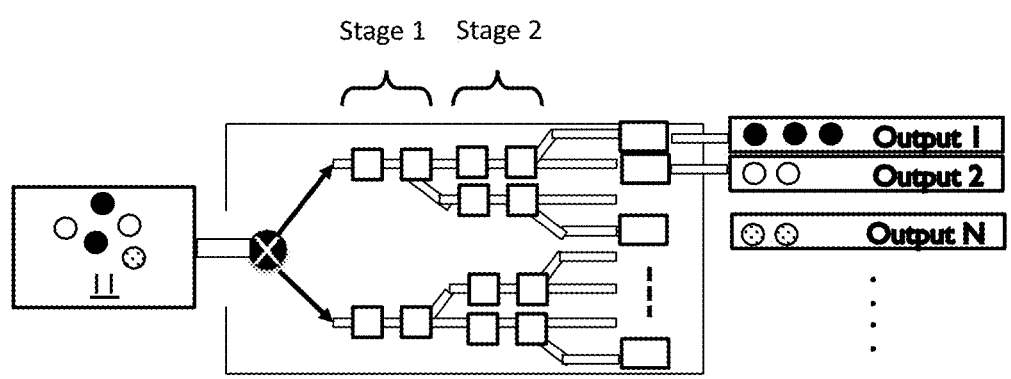
FIG. 29 illustrates a second exemplary configuration of a plurality of microfluidic channels in a device in accordance with embodiments.

An application may also require more than one type of object, e.g., more than one target particle type, to be discerned, e.g., to be sorted out. Referring to FIG. 29, the device may also be configured in accordance with a multi-stage routing configuration, e.g., in which the sorting elements are organized differently. For example, sorting elements may be connected in series, e.g., in which each routing stage is adapted for sorting out one or more types of objects, for example, such that over multiple stages that are connected in series all the target objects are sorted out. In such configuration, the serially connected particle detection and routing elements may be differently configured, e.g., in accordance with different parameters, e.g., to detect and sort different types of objects in different stages. Furthermore, the serial routing tree may also be parallelized, e.g., to improve the throughput or quantity of object types to be sorted.

Figure 30:
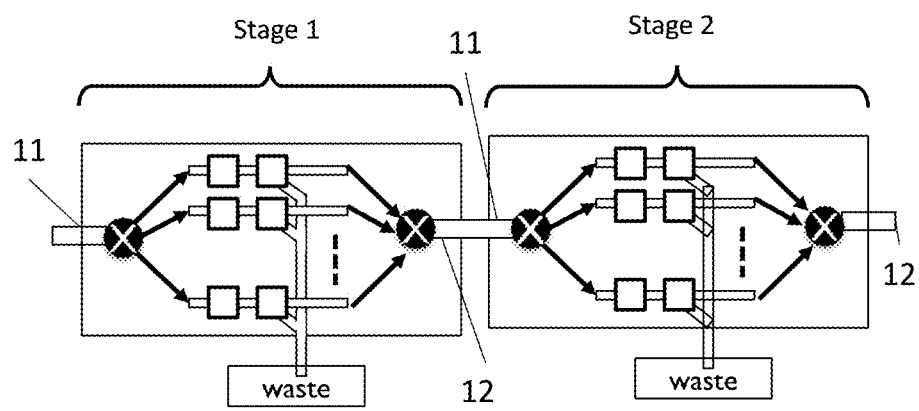
FIG. 30 illustrates a third exemplary configuration of a plurality of microfluidic channels in a device in accordance with embodiments.

Referring to FIG. 30, two devices in accordance with embodiments may also be connected in series. For example, the output provided via an outlet 12 of a first device may be fed into the inlet 11 of a second device. The configuration, e.g., detection parameters, such as an optical wavelength, a quantity, etc., and/or routing parameters, such as a flow speed, a sorting power or sorting mechanism, a chip structure, can be the same or can be different between the multiple serially-connected devices. For example, a cascade detection and routing may be obtained using different parameter sets, e.g., to provide a good routing yield and purity.

Figure 31:
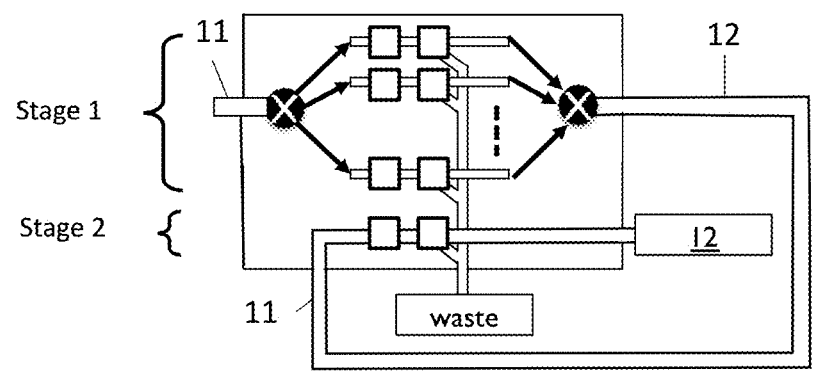
FIG. 31 illustrates a fourth exemplary configuration of a plurality of microfluidic channels in a device in accordance with embodiments.

FIG. 31 shows another exemplary configuration of a device in accordance with embodiments, e.g., another multi-stage sorting configuration. In this example, a second-stage routing element may be connected in series with a first-stage routing element. The first and second routing elements may be implemented on the same chip. The outlet 12 of the first-stage routing element may be fed into the inlet 11 of the second-stage routing element.

Figure 6:
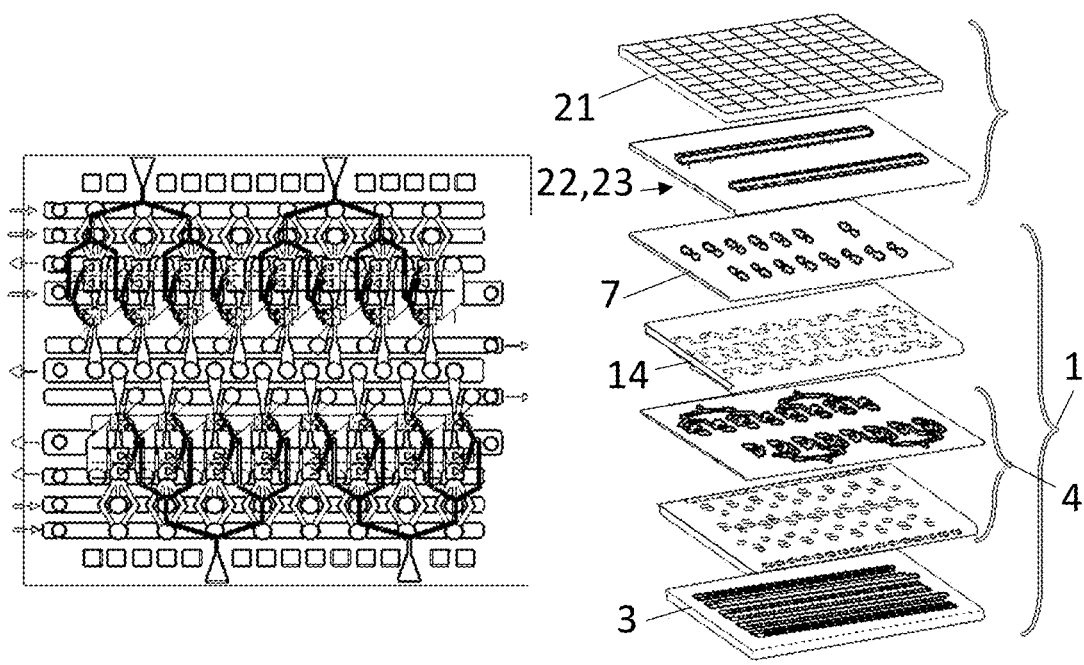
FIG. 6 illustrates an exemplary layered structure of a device in accordance with embodiments.

FIG. 6 illustrates an exemplary layered structure of a device in accordance with embodiments.

The first layer 4 may comprise a waveguide 5 for conveying a light wave. The on-chip optical waveguide 5 may be adapted for propagating, distributing, and/or focusing light onto objects 2 in flow in the microfluidic channel 6. The waveguide, or a plurality of waveguides, may be adapted for propagating, distributing, and/or focusing light onto objects 2 in flow in a plurality of logically parallel microfluidic channels 6.

The first layer 4 may comprise a silicon nitride (SiN) photonics layer, e.g., the waveguide 5 may comprise a SiN waveguide.

The first layer 4 may comprise an input light coupler 8 for coupling the light wave into the waveguide 5. For example, this input light coupler 8 may comprise a grating. Thus, external light may be coupled into the waveguide, e.g., a SiN waveguide, by the in-coupling structure such as to propagate further along the waveguide.

For example, the input light coupler 8 may facilitate coupling the light into the waveguide 5 from a side of the first layer 4 that is opposite from the side on which the first layer 4 abuts on the substrate 3. For example, the first layer 4 may extend beyond the microfluidic channel to leave part of the first layer 4 uncovered by the microfluidic channel to facilitate the coupling of light into the light coupler 8 from this part of the first layer 4.

Alternatively, the input light coupler 8 may facilitate coupling light into the waveguide 5 from a side of the first layer 4 on which the first layer 4 abuts on the substrate 3. For example, a further hole may be provided through the substrate 3 to expose part of the first layer 4 to facilitate the coupling of light into the light coupler 8 from this part of the first layer 4.

Alternatively, the input light coupler 8 may facilitate coupling light into the waveguide 5 from a side of the first layer 4 that is substantially orthogonal to the side on which the first layer 4 abuts on the substrate 3. For example, an edge of the first layer 4 may facilitate the coupling of light into the light coupler 8 from this edge.

Alternatively, the input light coupler 8 may facilitate coupling light into the waveguide 5 through the second layer 7, e.g., via a region inside or outside the fluidic channel 6.

For example, as shown in FIG. 1, the input light coupler 8 may be adapted for receiving the light to be coupled into the waveguide 5 by means of free-space illumination, e.g., by receiving a light beam impinging on the first layer after traveling through a free medium, e.g., a vacuum or gas, e.g., through air. For example, in use, an optical subassembly 111 of an instrumentation module may emit and project the light beam onto the input light coupler 8 when positioned in a predetermined operational position of the microfluidic routing device 1 relative to (e.g., in or on) the instrumentation module.

Furthermore, as shown in FIG. 2, the input light coupler 8 may be adapted for receiving the light to be coupled into the waveguide 5 by means of illumination from an optical fiber 112. For example, in use, a light beam may impinge on the first layer after exiting an optical fiber, for example, an optical fiber being part of an instrumentation module, as discussed further hereinbelow.

The first layer 4 may comprise an output light coupler 9 for coupling light out of the waveguide 5 and into the microfluidic channel 6. For example, this output light coupler 9 may comprise a grating. For example, the output light coupler 9 may be a focusing light coupler, e.g., a focusing grating, e.g., to focus the light wave conveyed by the waveguide in a focal spot at a predetermined location in the microfluidic channel. For example, the output light coupler 9 may be adapted for coupling light out of the waveguide to form a light beam of a predetermined shape into the microfluidic channel, such as to illuminate an object when passing by through the microfluidic channel, e.g., to illuminate a passing cell.

The second layer 7 is adapted for transmitting an optical signal from the microfluidic channel 6, e.g., to the side of the second layer 7 that is opposite of the side of the second layer 7 on which the microfluidic channel 6 is provided.

For example, the second layer 7 may comprise a transparent material, e.g., glass.

Figure 13:
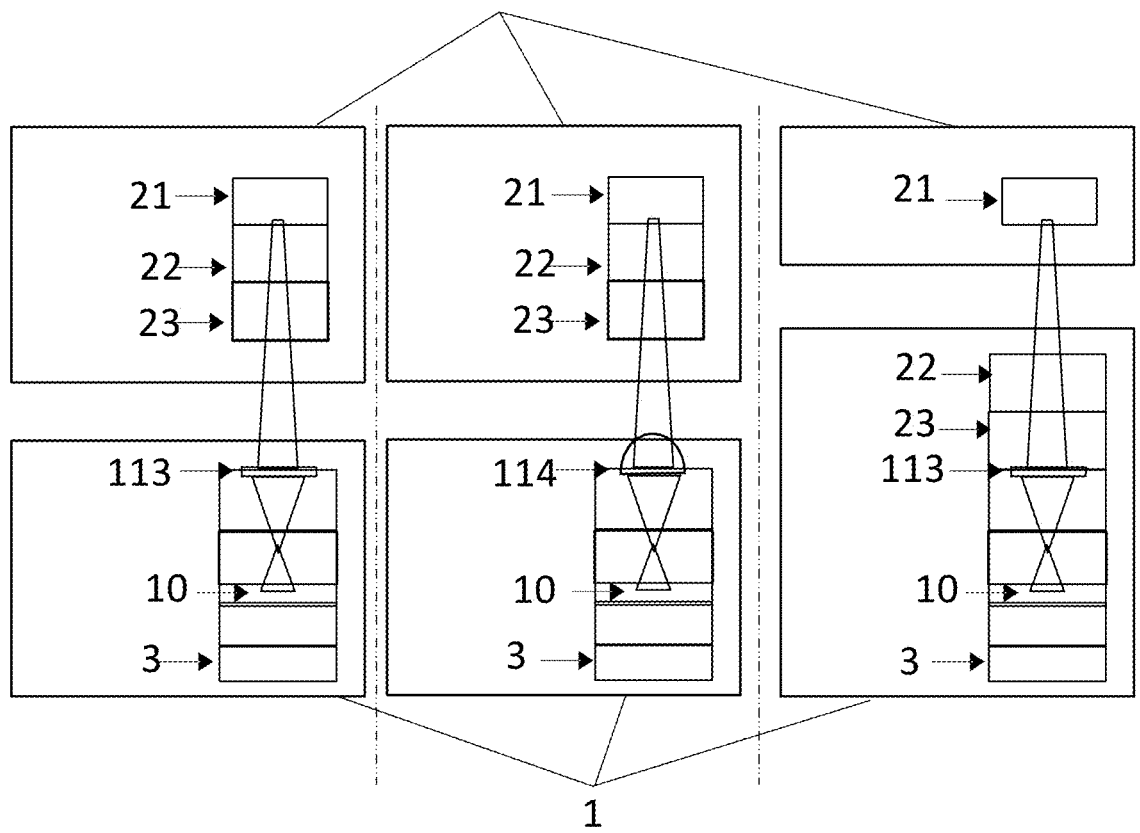
FIG. 13 schematically illustrates three different exemplary means of directly coupling an optical signal (e.g., via a freely propagating wave through a vacuum or gas medium) between a device and an instrumentation module in accordance with embodiments.

The second layer 7 may comprise an optical element 10 for refracting and/or diffracting the optical signal toward a predetermined region of space for positioning a light transducing element in, the predetermined region of space being located outside the device, e.g., toward the opposite side of the second layer 7 than the side of the second layer 7 that is adjacent to the microfluidic channel 6. For example, the optical element may be adapted for forming an image to be acquired by an imaging pixel array when placed in the predetermined region of space. For example, the optical element may be adapted for projecting light from a region of interest in the microfluidic channel onto a photodetector, when the photodetector is provided in the predetermined region of space. For example, the optical element may comprise refractive and/or diffractive optics such as a microlens or an objective lens, e.g., a flat lens. The optical element, e.g., a lens, may be integrally formed as part of the device or may be assembled onto the device. For example, FIG. 13 schematically illustrates three different exemplary embodiments. As shown, the device 1, e.g., encapsulated in a cartridge as described further hereinbelow, may comprise rejection filters 22 and/or color filters 23, for example in combination with a flat lens 113. In another exemplary embodiment, as shown in FIG. 13, the device 1 may comprise a flat lens 113 or a micro-lens 114, and not necessarily a rejection filter 22 or color filter 23. For example, such filters 22, 23 may be alternatively implemented in an instrumentation module 160, as described further hereinbelow, that is adapted for receiving, and operating in conjunction with, the device 1.

Alternatively, or additionally, the second layer 7 may comprise a further waveguide, e.g., a photonic waveguide, for conveying the optical signal after being received from the microfluidic channel, e.g., after having interacted with a sample fluid and/or target objects in the microfluidic channel. The optical element 10 may thus also comprise an input coupler for coupling the optical signal into the further waveguide, e.g., a grating coupler. The second layer may comprise a photonic processing circuit, e.g., integrated in the further waveguide or configured to interact with light conveyed by the further waveguide. The second layer may comprise an output light coupler for coupling light out of the further waveguide.

The light-receiving means, e.g., the input light coupler 8, and the light outputting means, e.g., the optical element 10, may be provided on a front side of the device, i.e., on a side distal to the substrate, while fluidic input and output means, e.g., the inlet 11 and the outlet 12, may be provided on a back side of the device, e.g., on a side proximal to the substrate. Furthermore, electrical contacts for receiving electrical control signals and/or electrical power supply voltages and/or currents may also be provided on the back side. Thus, the front side may be reserved for optics. Therefore, the device can be very compact, easily integrated into a cartridge, and may be easily used in practice.

The first layer 4 may comprise a plurality of output light couplers 9 for coupling light out of the waveguide 5 and into the microfluidic channel 6 in corresponding predetermined regions of the microfluidic channel. Likewise, the second layer 7 may comprise a plurality of optical elements 10 for collecting light from the corresponding predetermined regions of the microfluidic channel.

For example, the predetermined regions 19 in the microfluidic channel may provide detection spots for forward scatter signal detection, side scatter detection, fluorescence detection, holographic imaging, and/or conventional microscopic imaging.

For example, fluorescence light emitted by an object in flow in the microfluidic channel, when excited by light provided in one of the predetermined regions in the microfluidic channel referred to hereinabove, may be collected by an optical element 10. This optical element may collimate the emission light.

The device may also comprise optical filters, such as rejection filters 22 and/or color filters 23, e.g., to remove the excitation light and pass the emission light spectrum of interest. However, such optical filters can also form part of a cartridge in accordance with embodiments of the second aspect or an instrumentation module in a system in accordance with embodiments of the third aspect.

The device 1 may also comprise an actuator 13 for actuating the objects of interest 2 in a sorting junction of the microfluidic channel 6.

The actuator 13 may receive an electric supply and/or a control signal via a contact that is provided through the substrate 3, e.g., via a conductor provided through the substrate 3 that forms an externally accessible contact on the side of the substrate that is opposite to the side of the substrate on which the microfluidic channel is provided.

For example, after the objects are identified by optical detection, the objects may be sorted. For example, the objects of interest 2 may be separated from different nuisance objects in the microfluidic channel by controlling the actuator 13. For example, the outlet 12 may be adapted for allowing the immersed objects of interest to flow out of the microfluidic channel, while the device comprises a further outlet 17, e.g., a waste outlet, and/or a waste reservoir for collecting immersed nuisance objects. Likewise, the device may comprise a plurality of outlets 12 and a plurality of actuators to fractionate the fluid in the microfluidic flow in accordance with different types of objects of interest, e.g., to separate the fluid and its immersed objects into more than 2 different fractions characterized by the objects contained therein.

For example, the actuator 13 may comprise a jet flow actuation element as known in the art. For example, the jet flow actuation element may comprise a thermal vapor bubble heater, e.g., a bubble jet sorter, a piezo-electric disc, a micromachined valve, and/or a coupling through an external energy source.

Figure 7:
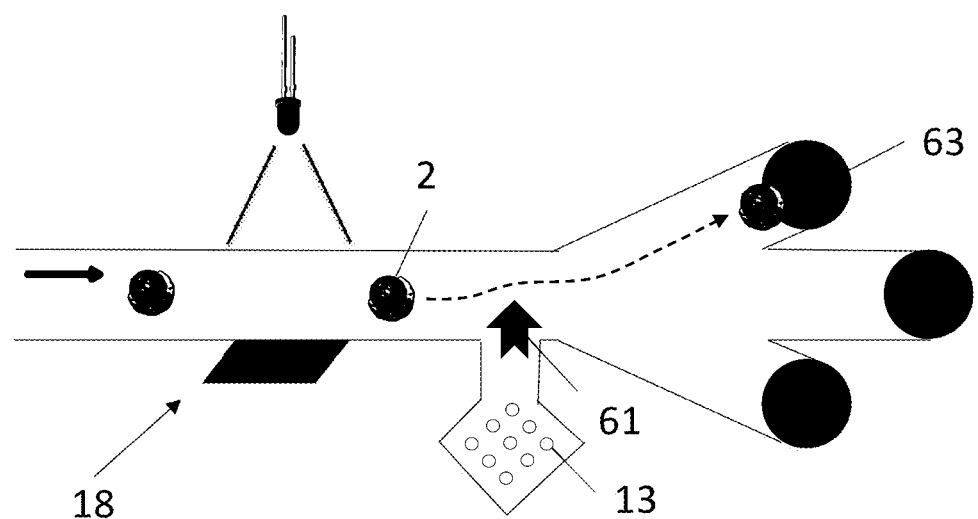
FIG. 7 illustrates an exemplary actuator structure in a device in accordance with embodiments.

As schematically illustrated in FIG. 7, such jet flow actuation element may fire a rapid jet flow 6 onto the object 2 to be sorted to deflect the object's trajectory. Thus, the object can be routed, i.e., sorted, into a selected post-sorting channel, e.g., a selected outlet channel 63. For example, the jet flow actuation element may comprise a jet flow generation chamber connected to the microfluidic channel.

The device may comprise a momentum detection region 18 in or near a sorting junction, e.g., slightly upstream with respect to the sorting junction. The sorting junction may refer to a part of the microfluidic channel where the actuator can act effectively on the object of interest.

In or near the momentum detection region, the device may be adapted for sensing a moment, e.g., a linear moment, of an incoming object of interest approaching the sorting junction and/or to trigger a routing signal, e.g., when in use in conjunction with an instrumentation module as described further hereinbelow.

In or near the momentum detection region, the device, e.g., the first and/or second layer, may comprise optical detection means, e.g., for scatter and/or fluorescence detection, and/or electrical detection means, e.g., to detect a transient current and/or an impedance of the object of interest.

It shall be understood by the skilled person that the device may comprise, in or near the momentum detection region, a light coupler for coupling light, e.g., from the waveguide 5, to a predetermined region of the microfluidic channel near the actuator 13 and light collecting optics, e.g., an optical element 10 in the second layer 7, for projecting light from the predetermined region in the microfluidic channel toward a region where, in operation of the device, a light transducing element is to be provided. Thus, the momentum detection region may refer only to a light-guiding part of a momentum detector, in which the whole of the momentum detector is formed in conjunction with detection and processing means in an instrumentation module to be connected to the device in operation.

For example, in or near the momentum detection region, the second layer 7 may be adapted for transmitting a further optical signal from the microfluidic channel 6, and the first layer 4 may comprise a further output light coupler for coupling light out of the waveguide 5 and into the microfluidic channel 6. Therefore, details of embodiments described in the present description that relate to the transmission of the optical signal through the second layer 7 and to the output light coupler 9 for coupling light out of the waveguide 5 into the microfluidic channel may equally apply to structural and/or functional features relating to the momentum detection region, e.g., relating to the further output light coupler and/or the further optical signal.

Alternatively, or additionally, in or near the momentum detection region, the first layer may comprise electrical detection means, e.g., to perform an impedance measurement through the microfluidic channel 6 in joint operation with the instrumentation module.

The device may be, in or near the momentum detection region, preferably adapted for measuring a speed of the object. Such speed may be used in order to adapt a routing-firing timing to a specific velocity in flow of the object to be sorted.

If a location in the microfluidic channel where optical detection is carried out, e.g., in a location defined by the output coupler 9 and/or the optical element 10, is too far from the sorting junction, the time that the object 2 spends to flow to the sorting junction may have an associated error margin that is too large for accurate actuation of the object in order to achieve efficient and effective sorting. The momentum detection may overcome this limitation by triggering the actuation control at a predetermined and accurate instant in time to redirect the object appropriately to be sorted.

The device may comprise a microfluidic flow focuser for focusing a flow in the microfluidic channel, e.g., to constrain a lateral and/or vertical position of objects in flow in the microfluidic channel near the sorting junction. The microfluidic flow focuser may thus confine the flow of the objects, e.g., of cells, in the middle of the microfluidic channel, e.g., in a region forming a central part of the cross-section of the microfluidic channel, such as to support optical detection, e.g., scatter and/or fluorescence detection, and/or imaging of the objects in flow in the microfluidic channel, and/or to improve the accuracy of, and/or the ease of effective controlling of, the actuator. A plurality of microfluidic flow focusers may be provided in the microfluidic channel, e.g., to refocus at a plurality of locations in the microfluidic channel, e.g., downstream of (and near to) the predetermined regions in the microfluidic channel providing detection spots for forward scatter signal detection, side scatter detection, fluorescence detection, holographic imaging and/or conventional microscopic imaging, and/or downstream of (and near to) the sorting junction.

Figure 3:
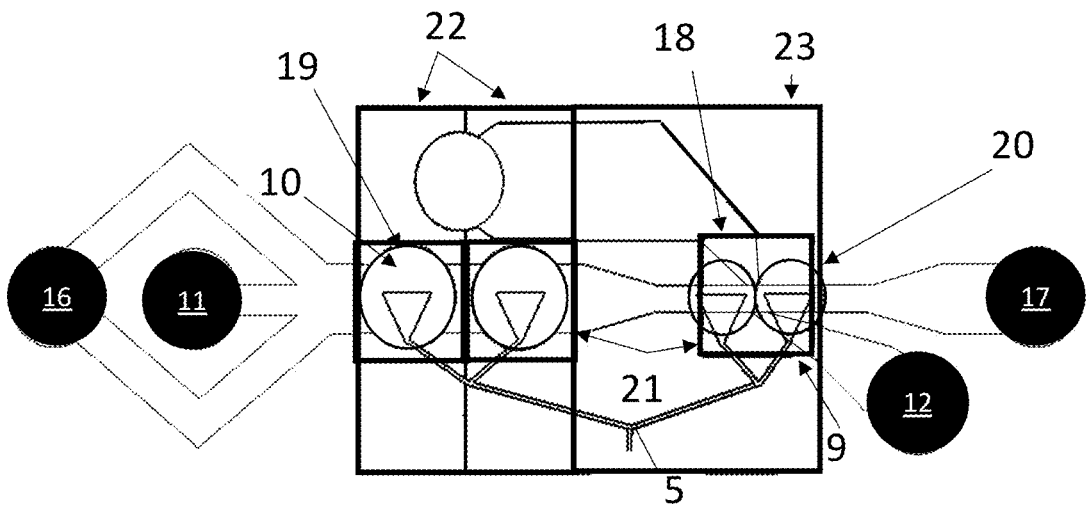
FIG. 3 illustrates a top view of the second exemplary device in accordance with embodiments.

The microfluidic flow focuser may comprise a hydrodynamic focusing device, e.g., for generating buffering flows around the object 2 to maintain the object flowing in a central region of the microfluidic channel. Referring to FIG. 3, the device may comprise a further inlet(s) 16 and/or a further outlet(s), e.g., via a hole penetrating the substrate, for ingress and egress of the buffer flow.

The microfluidic flow focuser may comprise an acoustophoresis and/or dielectrophoresis element for focusing the object in flow by applying forces to the object. For example, for acoustophoresis, an acoustic transducer, such as a PZT disc or a piezo-electric element, may produce an acoustic field. For dielectrophoresis, electrodes may establish an AC electric field in the focusing channel. The acoustophoresis and/or dielectrophoresis element may receive an electric supply and/or a control signal via a contact that is provided through the substrate, e.g., a conductor provided through the substrate and forming an externally accessible contact on the side of the substrate that is opposite to the side of the substrate on which the microfluidic channel is provided.

The device may also comprise a validation detection region 20 for detecting a routed object after leaving the sorting junction, e.g., to confirm that an object of interest to be sorted by controlling the actuator was effectively actuated correctly. In or near the validation detection region, the device 1 may comprise an optical detection means, e.g., for detecting a scatter and/or fluorescence signal, and/or an electrical detection means, e.g., for detecting a transient current and/or an impedance. For example, the validation detector 20 may also facilitate the detection of a clogged outlet. Structural and/or functional features of the device in or near such validation region may be similar or equivalent to what is described in the present description in relation to the momentum detection region 18.

Figure 4:
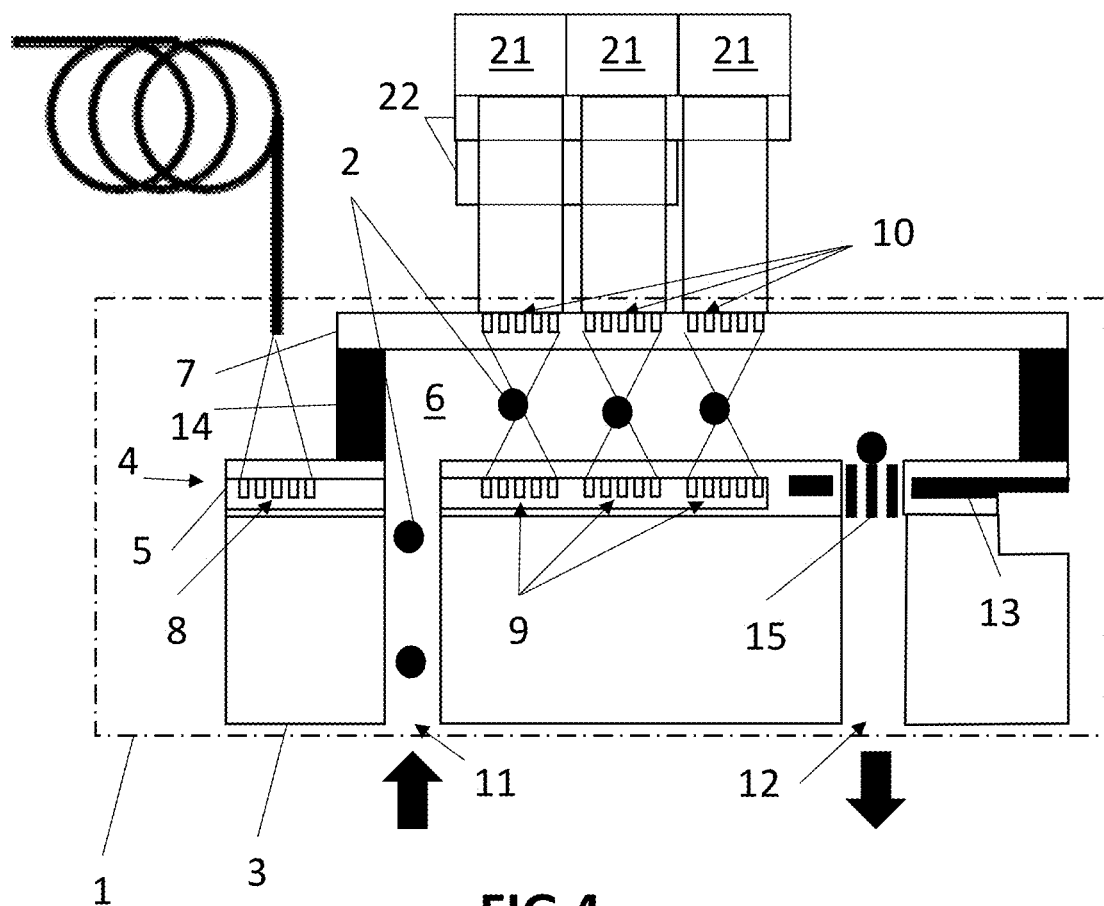
FIG. 4 illustrates a third exemplary device in accordance with embodiments.
Figure 5:
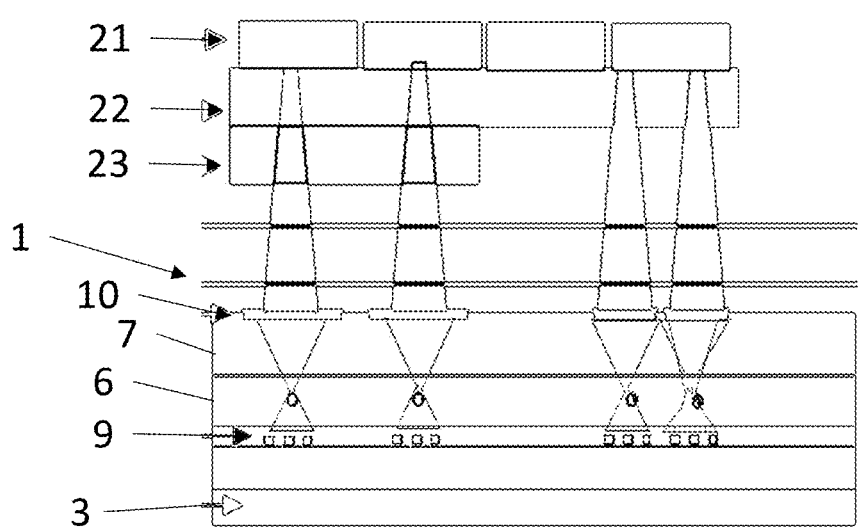
FIG. 5 shows a detailed view illustrating optical parts in a device in accordance with embodiments.
Figure 8:
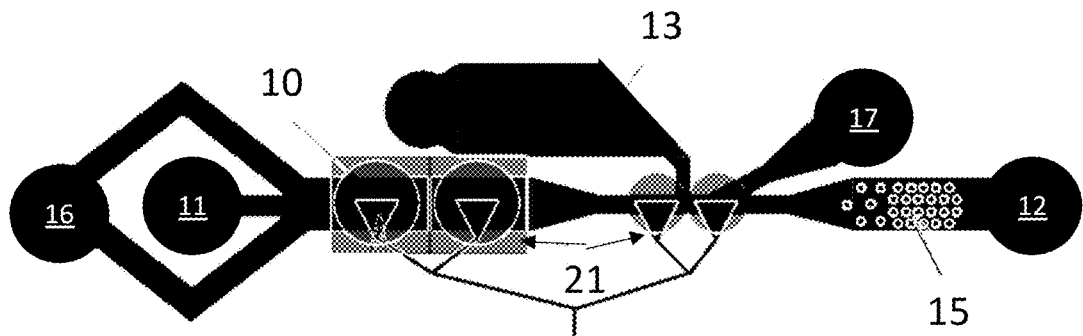
FIG. 8 illustrates a capture structure in a device in accordance with embodiments.

Referring to, for example, FIG. 4 and FIG. 8, the device in accordance with embodiments may also comprise a capture region 15 for capturing the objects of interest after being routed. For example, sorted cells may be captured for in-situ downstream analysis, such as cell staining or imaging.

For example, the capture region may be located downstream of the routing junction, e.g., immediately downstream of the routing junction. As such, the objects of interest, e.g., the sorted cells, may be captured immediately after being routed.

For example, the capture region may be located downstream from the actuator. For example, in a sorting region near the actuator, the microfluidic channel may split, e.g., bifurcate, and a capture region may be located in at least one leg of the microfluidic channel downstream of the sorting region.

The capture region may comprise capture structures, e.g., cell capture structures. For example, the capture region may be integrated in the first layer 4 and/or in the substrate 3. Alternatively, the cartridge in accordance with embodiments of the second aspect may comprise such capture structures, e.g., connected to an outlet 12 of the device 1.

The capture structures may comprise a through-chip micro-hole array or a micro-pillar array where the hole diameter or inter-pillar spacing is sufficiently small to capture the target objects, e.g., the target cells.

Figures 9, 10:
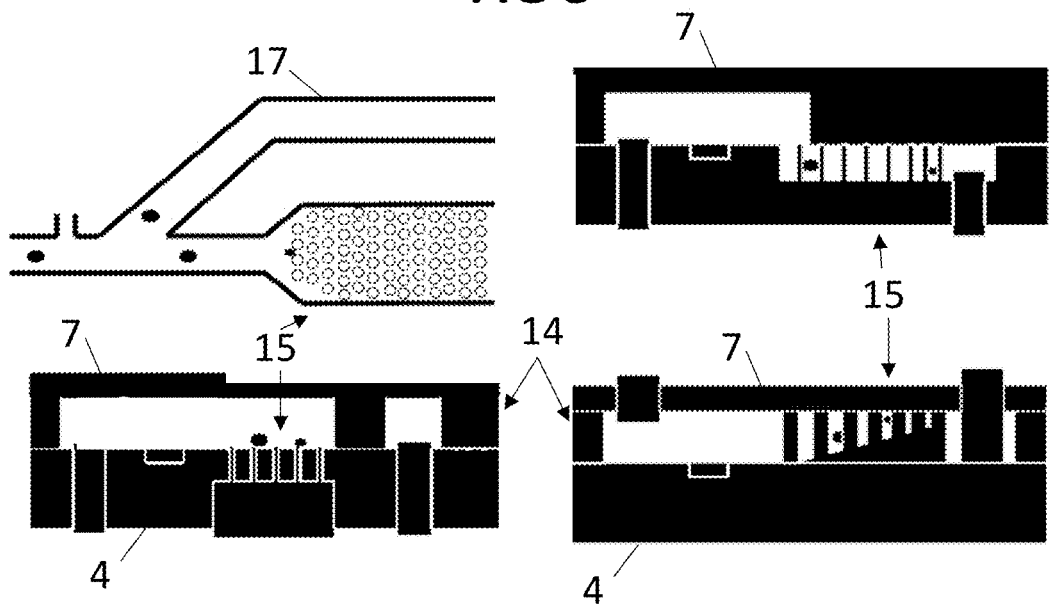
FIG. 9 illustrates an exemplary capture structure comprising silicon micro-pillars, for use in a device in accordance with embodiments.
FIG. 10 illustrates an exemplary capture structure comprising polymer micro-pillars, for use in a device in accordance with embodiments.

For example, FIG. 9 illustrates a capture region 15 formed by silicon micro pillars. For example, such silicon micro pillars may be integrated in the first layer 4. The capture region 15 may comprise micro pillars composed of a polymer material, e.g., integrated in, e.g., integrally formed in and from, the spacer layer 14, e.g., as illustrated in FIG. 10.

Figure 11:
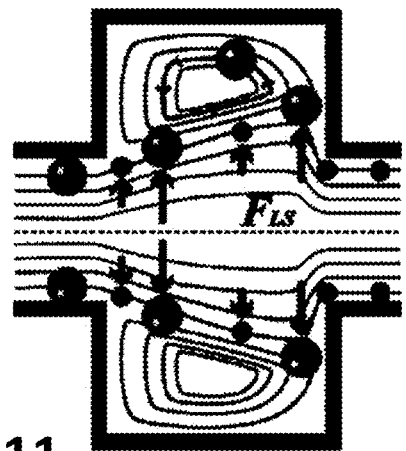
FIG. 11 illustrates an exemplary hydrodynamic capture structure for use in a device in accordance with embodiments.

The capture region may also be adapted for capturing the objects of interest based on a hydrodynamic characteristic of the objects of interest, e.g., by hydrodynamic capture or vortex capture of cells, e.g., as illustrated in FIG. 11.

A second aspect relates to a microfluidic router cartridge, e.g., a disposable microfluidic router cartridge that comprises, or consists of, an enclosure and a microfluidic routing device, in accordance with embodiments of the first aspect, encapsulated in the enclosure.

Referring to FIG. 11, an exemplary microfluidic router cartridge 110 in accordance with embodiments is schematically illustrated. The cartridge 110 comprises a microfluidic routing device 1 in accordance with embodiments.

The cartridge 110 may integrate functional components for physically handling a fluid sample.

The microfluidic router cartridge 110 may comprise a preparation module 120, e.g., at least one preparation component, e.g., for manipulating the fluid sample before introduction in the microfluidic channel 6.

The microfluidic router cartridge may comprise a sample fluid reservoir. For example, the sample fluid reservoir may be connected to the inlet 11 to allow a flow of the sample fluid, when contained in the sample fluid reservoir, via the inlet 11 to the microfluidic channel 6. For example, the preparation module 120 may comprise the sample fluid reservoir. The microfluidic router cartridge may comprise at least one reagent reservoir, e.g., for containing at least one reagent, e.g., for mixing and/or reacting with the fluid sample. For example, the preparation module 120 may comprise the at least one reagent reservoir.

The microfluidic router cartridge may comprise at least one post-processing module 130, e.g., a post-sorting processing component, e.g., for manipulating the fluid sample, e.g., a selected fraction of the fluid sample obtained by sorting, after extraction from the microfluidic channel 6.

For example, such post-processing may comprise a re-examination unit 140 for re-examining the selected fraction, e.g., the sorted objects. The re-examination unit may be adapted for imaging, or facilitating imaging, of the objects. The re-examination unit may be adapted for rerouting objects.

The cartridge 110 may also comprise a dispenser unit 150 for dispensing objects, e.g., after being selected by the routing device, in a suitable output form.

A third aspect relates to a microfluidic router system, e.g., a (biological) cell router system. Particularly, the router system may relate to a kit of parts, e.g., comprising at least a part consisting of a cartridge in accordance with embodiments of the second aspect and a part consisting of an instrumentation module, as described further hereinbelow.

Figure 12:
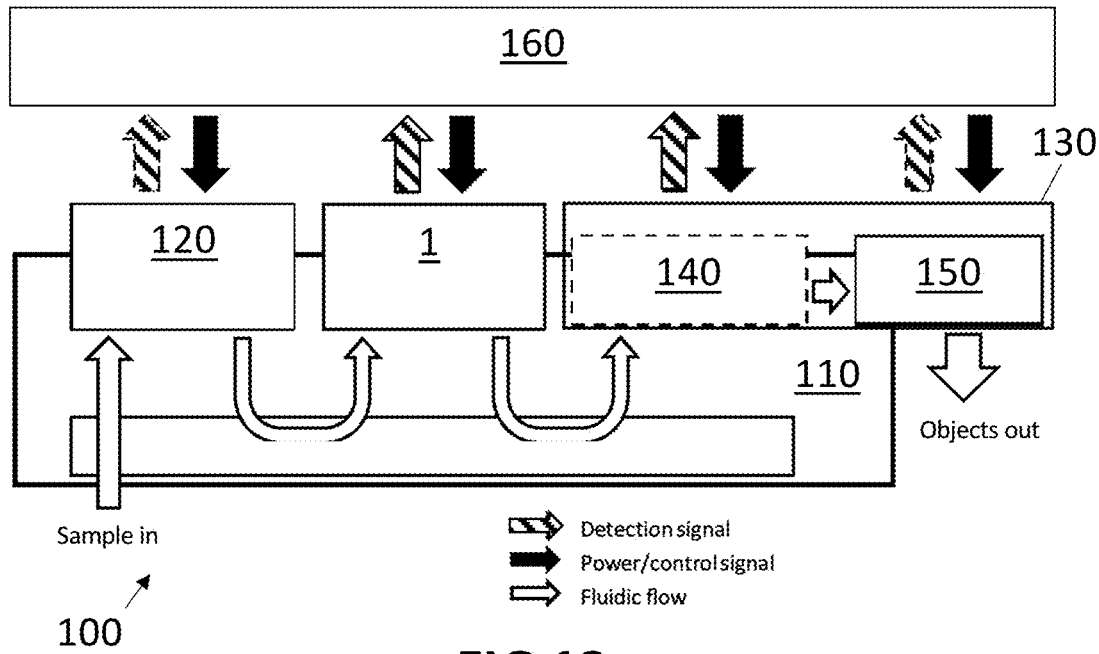
FIG. 12 shows a system in accordance with embodiments.

Referring to FIG. 12, an exemplary microfluidic router system 100 in accordance with embodiments is schematically illustrated.

The microfluidic router system comprises a microfluidic router cartridge 110, in accordance with embodiments of the second aspect, and an instrumentation module 160.

The instrumentation module 160 and the microfluidic router cartridge 110 are adapted for facilitating the microfluidic router cartridge to be mounted into and/or onto the instrumentation module to facilitate an analysis and/or a processing of a fluid sample comprising objects of interest 2, e.g., to facilitate an analysis or a processing of a sample when introduced in the microfluidic routing device as controlled by the instrumentation module. The instrumentation module 160 comprises a light transducing element 21 for receiving an optical signal indicative of an object of interest 2 in a microfluidic channel of the microfluidic routing device of the cartridge 110.

The microfluidic router cartridge may be disposable, e.g., may be a single-use cartridge, e.g., to prevent contamination, e.g., cross-contamination between different fluid samples being analyzed and/or contamination of a local environment with the fluid sample. Preferably, none of the hardware in the instrumentation module is potentially exposed to the fluid sample. The instrumentation module may be reusable. Where reference is made to 'mounting into,' it shall be understood that this does not necessarily imply that the cartridge, in the mounted position, is fully contained within the instrumentation module, e.g., embodiments may also comprise other means for mutually engaging the cartridge and the instrumentation module in a fixed and predetermined relative configuration with respect to one another, such as to facilitate the joint operation of the cartridge and the instrumentation module.

The instrumentation module may comprise peripheral hardware and/or software for facilitating the operation of the cell router cartridge.

The instrumentation module may comprise a processor, e.g., a digital processing unit, e.g., a central processing unit. The instrumentation module may comprise a digital storage memory, e.g., a read-only memory, a random-access memory and/or a persistent memory, such as a hard disk and/or a flash memory.

The instrumentation module may be adapted for providing system-level control functions.

The instrumentation module may be adapted for providing a user interface.

The instrumentation module may comprise input and/or output means, e.g., a human interface device, such as a keyboard and/or pointer device, and/or a display device, such as a projector or monitor.

The instrumentation module may comprise at least one light source, e.g., for generating a light wave such that the light wave is coupled into the input light coupler 8 of the microfluidic routing device when the microfluidic router cartridge is mounted in the instrumentation module. For example, the light source may be a light-emitting diode (LED), a laser, e.g., a laser diode, and/or a broad-spectrum light source, e.g., a lamp. The light source may comprise optical elements for shaping the light distribution of the light generated by the at least one light source. The light source may comprise an optic fiber.

The at least one light source may be adapted for emitting coherent light, partially coherent light or incoherent light. The at least one light source may be adapted for emitting polarized light, partially polarized light or unpolarized light. The at least one light source may be adapted for emitting at least partially linearly polarized light and/or at least partially elliptically (or circularly) polarized light. The at least one light source may comprise a polarization filter for polarizing the light emitted by an unpolarized light source. The at least one light source may be adapted for emitting light having a wavelength in a range from 100 nm to 100 µm, e.g., in the range from 300 nm to 1 µm. The at least one light source may be adapted for emitting a broad light spectrum, e.g., covering a continuous range of at least 150 nm, and/or light in a single narrowband or in a combination of multiple separate spectral narrow bands, e.g., the or each narrow spectral band having a width (e.g., FWHM) of less than 100 nm, e.g., in the range of 5 nm to 50 nm, e.g., in the range of 10 nm to 25 nm.

Alternatively, the at least one light source may be integrated in the microfluidic router cartridge.

The instrumentation module may comprise at least one light transducing element 21. For example, this light transducing element may be positioned in the predetermined region of space whereto the optical element 10 in the second layer 7 may refract and/or diffract an optical signal when the cartridge is mounted in the instrumentation module.

The light transducing element may comprise an imaging pixel, an imaging pixel array, and/or a photodetector. The light transducing element may comprise a photomultiplier tube (PMT), an avalanche photodiode (APD), a micro PMT and/or APD array, and/or an imager. For example, the light transducing element may be based on CMOS technology, e.g., a CMOS image detector. For example, the light transducing element may be based on a silicon semiconductor material, e.g., a silicon APD.

For example, the light transducing element may comprise a silicon photomultiplier (SiPM). An example of the SiPM sorts with a 95% or even a 99% sorting accuracy for a high throughput, e.g., when processing about 1000 cells (or different micro-entities in flow) per second. For example, a SiPM detector may have an advantageously high signal-to-noise ratio (SNR).

Referring to FIG. 13, the light transducing element 21 may receive the optical signal directly, e.g., in the form of a wave freely propagating, e.g., in a vacuum or a gas medium, such as air, from the device 1 to the light transducing element. The instrumentation module may comprise rejection filters 22 and/or color filters 23, as illustrated, or such rejection filters and/or color filters may be implemented in the device 1, as discussed hereinabove.

Figure 14:
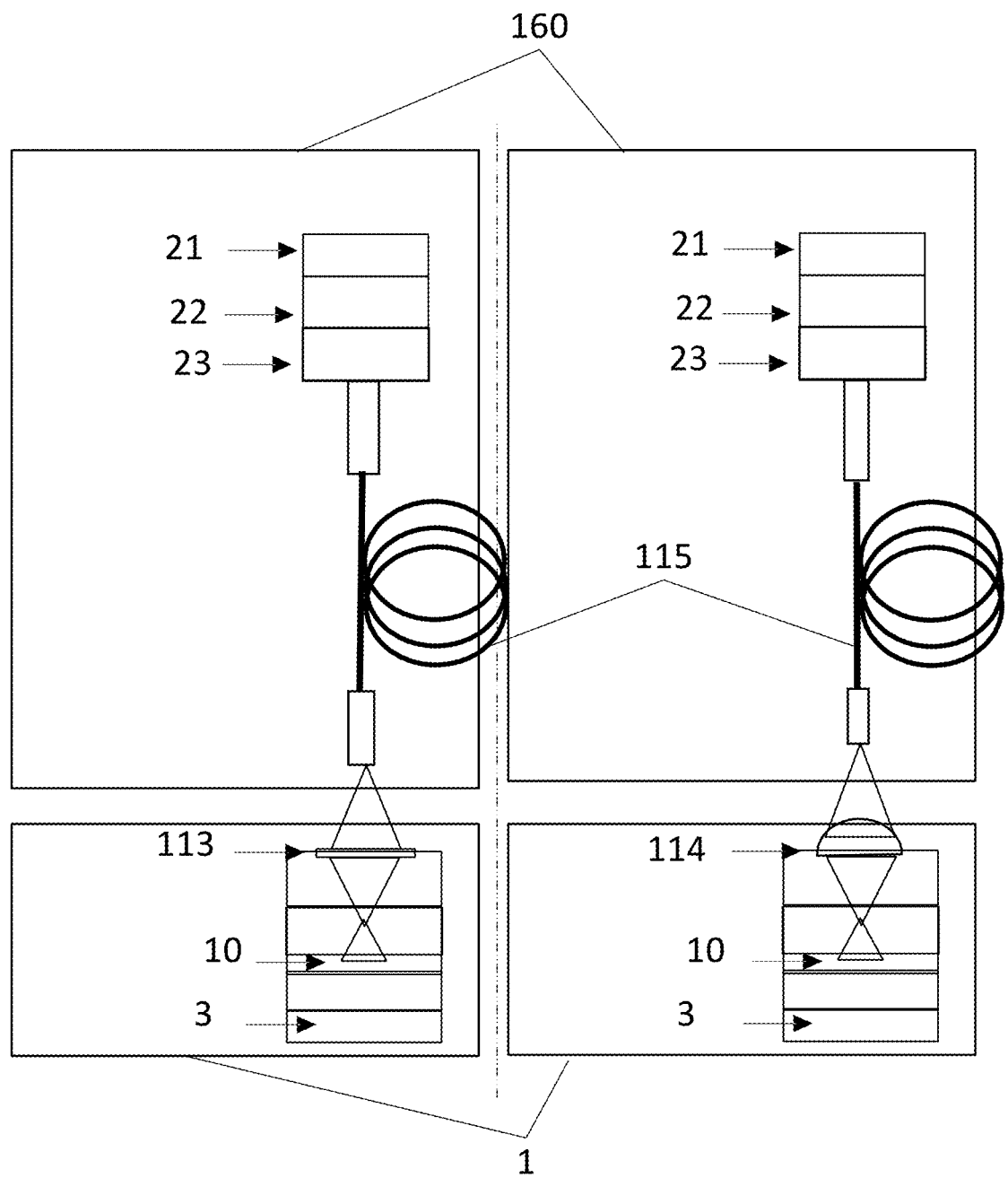
FIG. 14 schematically illustrates two different exemplary means of indirectly coupling an optical signal (e.g., via an optical fiber) between a device and an instrumentation module in accordance with embodiments.

Alternatively, the light transducing element 21 may receive the optical signal indirectly, e.g., via an optic fiber 115, as illustrated by the exemplary embodiments in FIG. 14.

The instrumentation module may comprise a signal processor for processing a signal transduced by the light transducing element in response to exposure of the light transducing element by a light signal from the cartridge. For example, the signal processor may be adapted for fluorescence detection and processing. For example, the signal processor may be adapted for generating an image and/or applying image processing to an image, e.g., of a cell in the microfluidic channel 6.

The signal processor may be adapted for, e.g., programmed for, identifying the target objects of interest, e.g., target cells, to be sorted.

The signal processor may be adapted for presenting the signal and/or information derived from the signal via the graphic user interface.

The instrumentation module may comprise a controller for driving electrical components in the cartridge. The controller may be adapted for actuation and/or control of the fluidics in the router cartridge.

For example, the signal processor may be adapted for identifying an object as a target object of interest, and the controller may be adapted for, in response to this identification as a target object of interest, activating the actuator, e.g., the jet flow actuation element, to deflect the object into a selected post-sorting channel, e.g., an outlet channel assigned to the target object type of interest.

For example, the signal processor may be adapted for analyzing a detected fluorescence signal, e.g., comparing a signal level, such as a signal amplitude, indicative of a detected fluorescence, to a predetermined range to identify the object, e.g., to decide a sorting action to be effected during a predetermined time frame following the detection event.

The controller may be adapted for receiving a sorting trigger signal from the momentum detection region, e.g., an optical or electrical signal from the device, originating in or near the momentum detection region, may be received by a momentum detector in the instrumentation module, and for activating the actuator in response to the identification of the object as a target object of interest and the subsequent receival of the trigger signal, e.g., activating the actuator after a predetermined or computed delay after receiving the trigger signal.

The controller and the signal processor may be separate components or co-integrated. For example, the module may comprise a real-time signal processor, a field-programmable gate array (FPGA), an application-specific integrated circuit (ASIC), and/or a microprocessor for implementing the controller and/or signal processor. The module may furthermore comprise support hardware, such as a data memory and/or input/output (I/O) handlers. The module may also comprise software and/or firmware for implementing the controller and/or signal processor when executed in the hardware.

The instrumentation module may comprise a post-sorting dispenser for, for example, transferring sorted cells to vials, e.g., plastic vials, or for smearing a suspension of sorted cells onto slides, e.g., glass slides.

The instrumentation module may be adapted for counting and/or registering sorted objects, e.g., before being dispensed into external containers by the post-sorting dispenser. For example, the signal processing unit may process a signal originating from the validation detection region 20, e.g., a yet further optical signal or a further electrical signal, to confirm a successful sorting action and to tally the sorted objects of interest. For example, the count value may be used to control a dispensed quantity of the objects by the dispenser.

A further aspect relates to a method for manufacturing a device 1 in accordance with embodiments of the first aspect. Details provided hereinabove relating to a device in accordance with embodiments may be considered to apply equally to a method of manufacturing the device in accordance with embodiments, and vice versa.

The method comprises providing the substrate 3, e.g., a silicon wafer, and providing the first layer 4 on the substrate. Providing the first layer 4 may comprise forming the actuator 13, for actuating objects of interest 2 in a sorting junction of the microfluidic channel 6, in the first layer. Forming the actuator 13 may comprise forming a heater structure, e.g., a conductive structure acting as an ohmic heater, in the first layer 4 on the substrate 3. Providing the first layer 4 may also comprise fabricating at least one waveguide in the first layer, e.g., after having provided the heater structure thereon.

The method also comprises providing a spacer layer 14 on the first layer 4 for spacing the second layer 7 away from the first layer 4 and for defining the microfluidic channel 6, e.g., for defining sidewalls of the microfluidic channel. For example, a photo-patternable adhesive layer may bond the first and second layers while spacing these layers apart. For example, the spacer layer 14 may be provided on the first layer 4 such that the first layer 4 forms a bottom wall of the microfluidic channel 6 formed in the spacer layer 14.

The method also comprises providing the second layer 7 on the spacer layer 14, such that the second layer 7 forms a top wall of the microfluidic channel 6. The second layer 7 is adapted for transmitting an optical signal from the microfluidic channel 6.

The method also comprises providing at least two holes through the first layer 4 to form respectively an inlet 11 and an outlet 12 for the microfluidic channel 6.

The method comprises manufacturing a sorting junction in the microfluidic channel and an actuator for actuating the objects of interest in the sorting junction.

For example, embodiments not being limited thereto, providing the heater structure may comprise the following steps.

Figure 15:
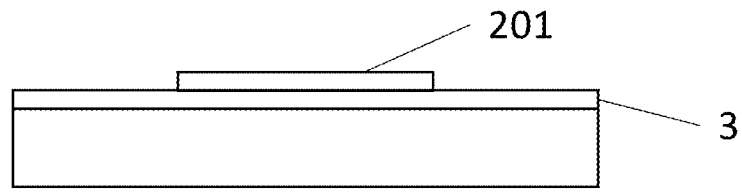
FIG. 15 illustrates a step of defining a heater conductor on a substrate in a method in accordance with embodiments.

Defining the heater structure may comprise defining a heater conductor 201 on the substrate 3, as illustrated in FIG. 15, for example, in a tungsten layer of 300 nm thickness.

Figure 16:
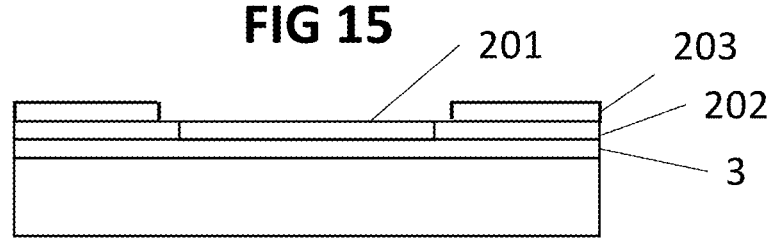
FIG. 16 illustrates a passivation etch, in fabricating a heater structure, in a method in accordance with embodiments.

Referring to FIG. 16, a passivation etch of respectively SiN 202, e.g., having a layer thickness of 500 nm, and SiC 203, e.g., having a layer thickness of 300 nm, may be provided to passivate a region around a part of the heater conductor 201 to be exposed.

Figure 17:
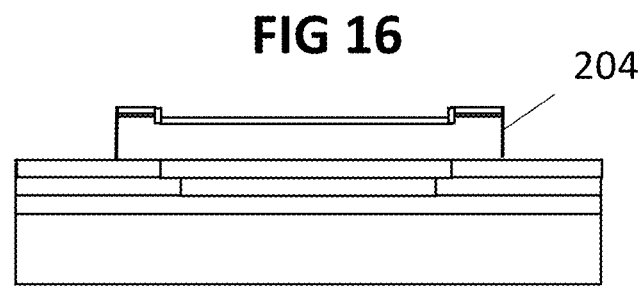
FIG. 17 illustrates a step of defining a heater element, in fabricating a heater structure, in a method in accordance with embodiments.

Referring to FIG. 17, over the exposed part of the heater conductor 201, and extending a predetermined margin over the passivation 203, a heater element 204 may be defined, e.g., by deposition of Al/Ti/TiN layers, e.g., having a thickness of 700 nm, and subsequent etching the deposited layers outside the predetermined margin around the exposed part of the heater conductor.

Figure 18:
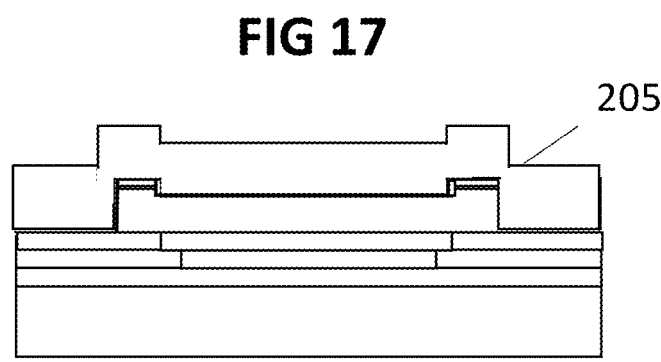
FIG. 18 illustrates a step of providing a further passivation over the heater element in a method in accordance with embodiments.

Referring to FIG. 18, a further passivation may be provided over the aforementioned layers, e.g., a $SiO_2$ passivation layer 205, for example, having a thickness of about 1 µm, e.g., for protecting the heater structure.

Figure 19:
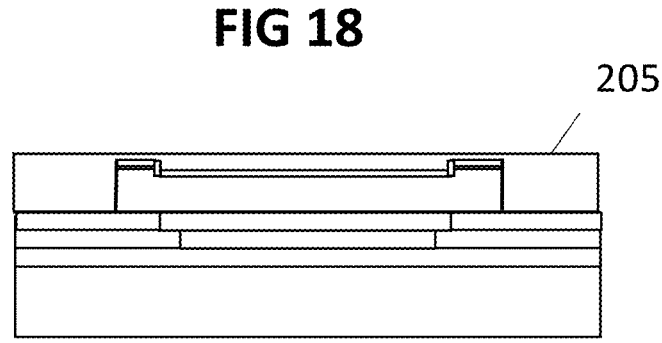
FIG. 19 illustrates a planarization step of the further passivation in a method in accordance with embodiments.

Referring to FIG. 19, defining the heater may comprise a planarization step, e.g., to planarize the top surface 206 after depositing the further passivation, for example using an oxide chemical-mechanical planarization.

Figure 20:
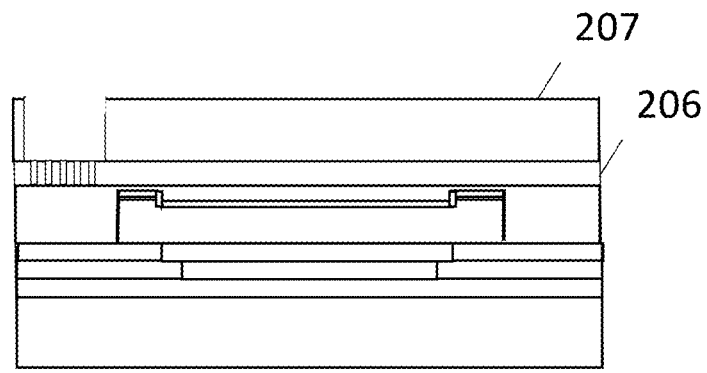
FIG. 20 illustrates a step of forming a waveguide on top of the planarized surface of the further passivation in a method in accordance with embodiments.

Referring to FIG. 20, providing the at least one waveguide may comprise forming the at least one waveguide, e.g., on top of the planarized top surface of the heater structure, embodiments not being limited thereto. For example, the waveguide(s) may be defined in a waveguide material layer, e.g., a SiN layer 207, for example, having a thickness of 180 nm, and a corresponding cladding layer, e.g., a $SiO_2$ cladding layer 206 For example, having a thickness of about 1 µm.

Figure 21:
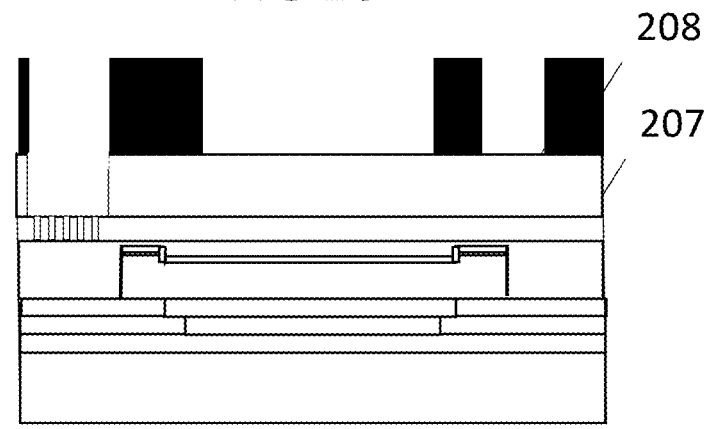
FIG. 21 illustrates a step of providing a spacer layer for defining a microfluidic channel in a method in accordance with embodiments.

Referring to FIG. 21, providing the spacer layer 14 on the first layer 4 for defining the microfluidic channel 6 may comprise providing a photo-patternable adhesive layer 208, e.g., using quartz to silicon bonding.

Figure 22:
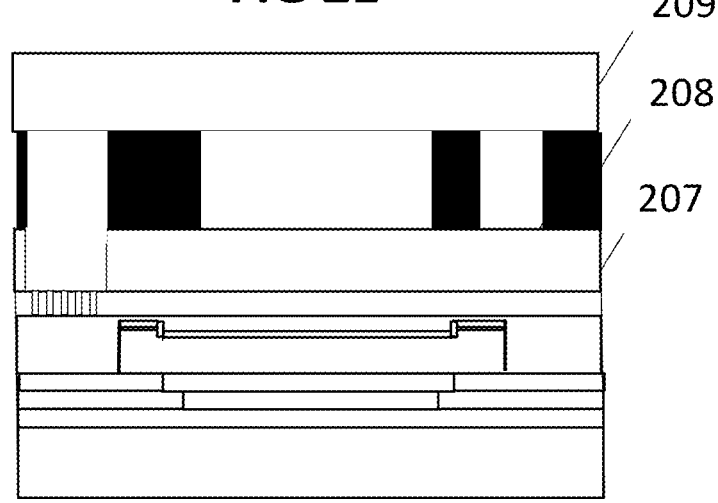
FIG. 22 shows a step of providing a second layer on the spacer layer to act as a top wall of the microfluidic channel in a method in accordance with embodiments.

Referring to FIG. 22, providing the second layer 7 on the spacer layer 14 may comprise, for example, bonding a glass substrate 209 onto the spacer layer.

Figure 27:
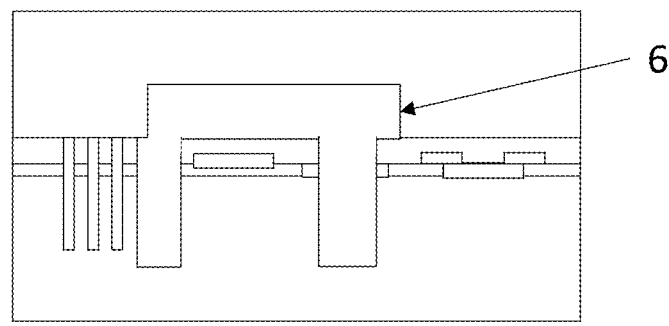
FIG. 27 illustrates a step of providing a spacer layer on the first layer and providing the second layer on the spacer layer by defining the spacer layer in a glass substrate and bonding the glass substrate to the first layer, in a method in accordance with embodiments.

Alternatively, as shown in FIG. 27, providing the spacer layer 14 on the first layer 4 and providing the second layer 7 on the spacer layer 14 may comprise defining the spacer layer in a glass substrate, e.g., by milling or etching, e.g., to define the microfluidic channel 6, and bonding the glass substrate to the first layer 4.

Providing at least two holes through the first layer to form, respectively, an inlet and an outlet for the microfluidic channel may comprise a backside etch of the substrate and the first layer.

In embodiments, after providing the first layer, e.g., after the planarization step illustrated in FIG. 19, and/or before providing the at least one waveguide, e.g., before a step as illustrated in FIG. 20, the top dielectric may also be etched to define openings for the inlet and outlet.

Figure 26:
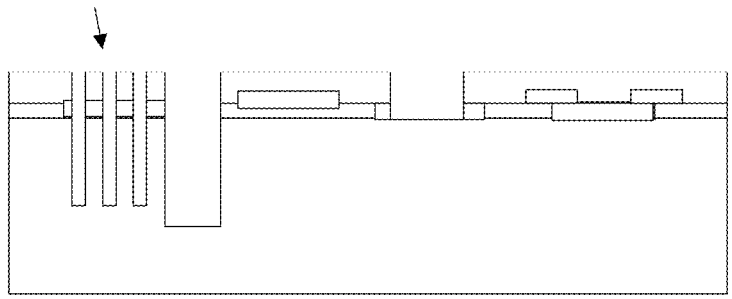
FIG. 26 shows a deep etch step to define a cell capture structure, in a method in accordance with embodiments.

Furthermore, in embodiments, after providing the first layer, e.g., after the planarization step illustrated in FIG. 19, and/or before providing the at least one waveguide, e.g., before a step as illustrated in FIG. 20, the top dielectric may also be etched to define pillars, as illustrated in the top diagram of FIG. 10. Additionally, or alternatively, the method may also comprise, after providing the first layer as discussed hereinabove, a deep (front-side) etch, e.g., a deep silicon etch through the first layer and partially penetrating into the substrate, to define a cell capture structure 212, as illustrated in FIG. 26.

Referring to FIG. 23, in the backside etch step, or an additional backside etch step, a through silicon via (TSV) 210 may be formed for connecting electrical components, such as the heater conductor 201. For example, such TSV may be plugged with a conductive material to form a connection and an externally accessible bondpad for powering the heater conductor.

Furthermore, in embodiments, providing the second layer may also comprise an additional step of providing at least one optical element, e.g., a lens, such as a flat lens 211, on top of the glass substrate 209, e.g., by die-to-die or die-to-wafer bonding, e.g., as illustrated in FIG. 24.

Figure 25:
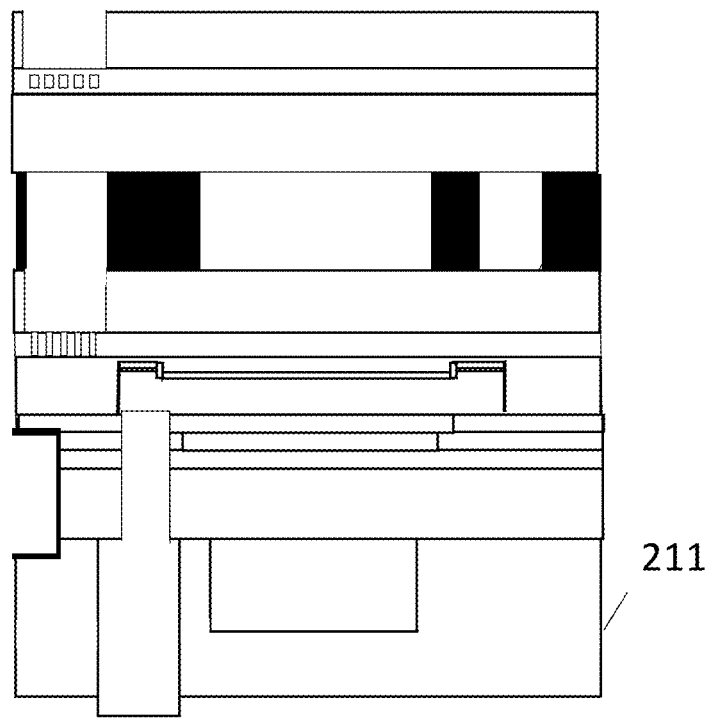
FIG. 25 shows a step of packaging a device in a cartridge, in a method in accordance with embodiments.

Referring to FIG. 25, the method in accordance with embodiments may also comprise a step of packaging the device in a cartridge, e.g., by bonding the substrate to a plastic cartridge element 211, e.g., an injection molded cartridge element.

The invention claimed is:

1. A microfluidic routing device for routing objects of interest in a microfluidic flow, the microfluidic routing device comprising:
   a substrate;
   a first layer provided on the substrate, in which the first layer forms a bottom wall of a microfluidic channel, wherein at least two holes through the first layer form respectively an inlet and an outlet for the microfluidic channel, wherein the first layer comprises a waveguide for conveying a light wave and an input light coupler for coupling the light wave into the waveguide from an external source, wherein the input light coupler comprises a grating coupler;
   a second layer spaced away from the first layer, in which the second layer forms a top wall of the microfluidic channel, wherein the second layer is configured to transmit an optical signal from the microfluidic channel; and
   an actuator for actuating the objects of interest in a sorting junction of the microfluidic channel, wherein the actuator-is configured to receive an electric supply and a control signal via at least one electrical conductor provided through the substrate, in which the at least one electrical conductor forms an externally accessible contact on the side of the substrate that is opposite to the side of the substrate on which the microfluidic channel is provided.

2. The microfluidic routing device of claim 1, further comprising a spacer layer for spacing the second layer away from the first layer and for defining the microfluidic channel.

3. The microfluidic routing device of claim 1, wherein the input light coupler is configured to couple the light wave into the waveguide from a side of the first layer that is opposite from the side on which the first layer abuts on the substrate.

4. The microfluidic routing device of claim 1, wherein the first layer comprises an output light coupler for coupling light out of the waveguide and into the microfluidic channel.

5. The microfluidic routing device of claim 1, wherein the second layer comprises an optical element for refracting or diffracting the optical signal toward a predetermined region of space outside the microfluidic routing device for receiving a light transducing element.

6. The microfluidic routing device of claim 5, wherein the input light coupler is configured to couple the light wave into the waveguide from a side of the first layer that is opposite from the side on which the first layer abuts on the substrate, wherein the first layer comprises a plurality of output light couplers for coupling light out of the waveguide—and into the microfluidic channel in corresponding predetermined regions of the microfluidic channel, and wherein the second layer comprises a corresponding plurality of optical elements—for collecting light from the predetermined regions of the microfluidic channel.

7. The microfluidic routing device of claim 6, wherein the predetermined regions in the microfluidic channel provide detection spots for at least one of: forward light scattering, side scattering, fluorescence detection, holographic imaging, and conventional microscopic imaging.

8. The microfluidic routing device of claim 1, further comprising a momentum detection region in the sorting junction or upstream with respect to the sorting junction, wherein the microfluidic routing device is configured to, in or near the momentum detection region, sense a linear moment or velocity of an object approaching the sorting junction or wherein the momentum detector is configured to trigger a routing signal.

9. The microfluidic routing device of claim 1, wherein the microfluidic routing device is configured to, in or near a validation detection region, detect an object of interest after leaving the sorting junction.

10. The microfluidic routing device of claim 1, further comprising a capture region for capturing the objects of interest after leaving the sorting junction.

11. A disposable microfluidic router cartridge comprising an enclosure and a microfluidic routing device in accordance with claim 1, the microfluidic routing device being encapsulated in the enclosure.

12. A microfluidic router system comprising a microfluidic router cartridge in accordance with claim 11 and an instrumentation module, wherein the instrumentation module and the microfluidic router cartridge are configured to facilitate the microfluidic router cartridge to be mounted into or onto the instrumentation module to facilitate an analysis or a processing of a fluid sample comprising objects of interest, the instrumentation module comprising a light transducing element for receiving an optical signal indicative of an object of interest in a microfluidic channel of the microfluidic routing microfluidic routing device in the cartridge.

13. The microfluidic routing device of claim 2, wherein the first layer comprises a waveguide for conveying a light wave and an input light coupler for coupling the light wave into the waveguide from an external source.

14. The microfluidic routing device of claim 3, wherein the first layer comprises an output light coupler for coupling light out of the waveguide and into the microfluidic channel.

15. The microfluidic routing device of claim 2, wherein the second layer comprises an optical element for refracting or diffracting the optical signal toward a predetermined region of space outside the microfluidic routing device for receiving a light transducing element.

16. The microfluidic routing device of claim 2, wherein the actuator is configured to receive or both of an electric supply and a control signal via at least one electrical conductor provided through the substrate, in which the at least one electrical conductor forms an externally accessible contact on the side of the substrate that is opposite to the side of the substrate on which the microfluidic channel is provided.

17. The microfluidic routing device of claim 2, comprising a momentum detection region in the sorting junction or upstream with respect to the sorting junction, wherein the microfluidic routing device is configured to, in or near the momentum detection region, sense a linear moment or velocity of an object approaching the sorting junction or wherein the momentum detector is configured to trigger a routing signal.

* * * * *